(12) United States Patent
Gunji

(10) Patent No.: US 8,744,233 B2
(45) Date of Patent: Jun. 3, 2014

(54) IMAGE SIGNAL PROCESSING APPARATUS, IMAGE SIGNAL PROCESSING METHOD, AND PROGRAM

(75) Inventor: Koichi Gunji, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 252 days.

(21) Appl. No.: 13/306,479

(22) Filed: Nov. 29, 2011

(65) Prior Publication Data

US 2012/0148209 A1      Jun. 14, 2012

(30) Foreign Application Priority Data

Dec. 8, 2010   (JP) ................................ 2010-273567

(51) Int. Cl.
*H04N 5/77*   (2006.01)
(52) U.S. Cl.
USPC ........................ 386/224; 345/593; 386/E5.07
(58) Field of Classification Search
USPC ............................... 386/224, E5.07; 345/593
See application file for complete search history.

(56) References Cited

U.S. PATENT DOCUMENTS

2006/0012714 A1 *   1/2006   Louie et al. .................... 348/581
2011/0102646 A1 *   5/2011   Minagawa .................... 348/242

FOREIGN PATENT DOCUMENTS

JP         2007-096472         4/2007

* cited by examiner

*Primary Examiner* — Thai Tran
*Assistant Examiner* — Girumsew Wendmagegn
(74) *Attorney, Agent, or Firm* — Cowan, Liebowitz & Latman, P.C.

(57) ABSTRACT

An image signal processing apparatus converts an input image signal such that the number of pixels in the horizontal direction is converted into 2n pixels, to store the thus-converted into a memory, samples the pixels of the stored image signal in accordance with a predetermined pixel arrangement of a display apparatus to convert the number of pixels in the horizontal direction into n pixels and convert the number of pixels in the vertical direction into m pixels, subsequently converts the image signal converted into n×m pixels into a plurality of color component signals corresponding to the pixels of the display apparatus, further, corrects a center of gravity in accordance with the predetermined pixel arrangement of the display apparatus to output the corrected signals to the display apparatus.

18 Claims, 19 Drawing Sheets

| R | G | B | R | G | B | R | G | B | R | G | B |
|---|---|---|---|---|---|---|---|---|---|---|---|
| R | G | B | R | G | B | R | G | B | R | G | B |
| R | G | B | R | G | B | R | G | B | R | G | B |
| R | G | B | R | G | B | R | G | B | R | G | B |

302

| | R | G | B | R | G | B | R | G | B | R | G | B | |
|---|---|---|---|---|---|---|---|---|---|---|---|---|---|
| G | B | R | G | B | R | G | B | R | G | B | R | G | |
| | R | G | B | R | G | B | R | G | B | R | G | B | |
| G | B | R | G | B | R | G | B | R | G | B | R | G | |

FIG. 4A

| | 0 | 1 | 2 | 3 | 4 | 5 | 6 | 7 | ... | 637 | 638 | 639 |
|---|---|---|---|---|---|---|---|---|---|---|---|---|
| EVEN 0 | Y 00 | Y 01 | Y 02 | Y 03 | Y 04 | Y 05 | Y 06 | Y 07 | | Y 0637 | Y 0638 | Y 0639 |
| ODD 1 | Y 10 | Y 11 | Y 12 | Y 13 | Y 14 | Y 15 | Y 16 | Y 17 | | Y 1637 | Y 1638 | Y 1639 |
| EVEN 2 | Y 20 | Y 21 | Y 22 | Y 23 | Y 24 | Y 25 | Y 26 | Y 27 | | Y 2637 | Y 2638 | Y 2639 |
| ODD 3 | Y 30 | Y 31 | Y 32 | Y 33 | Y 34 | Y 35 | Y 36 | Y 37 | | Y 3637 | Y 3638 | Y 3639 |
| ... | | | | | | | | | | | | |
| ODD 1079 | | | | | | | | | | | | |

FIG. 4B

| | | | | | | | |
|---|---|---|---|---|---|---|---|
| Cr 00 | Cr 01 | Cr 02 | Cr 03 | Cr 04 | Cr 05 | Cr 06 | Cr 07 |
| Cr 10 | Cr 11 | Cr 12 | Cr 13 | Cr 14 | Cr 15 | Cr 16 | Cr 17 |
| Cr 20 | Cr 21 | Cr 22 | Cr 23 | Cr 24 | Cr 25 | Cr 26 | Cr 27 |
| Cr 30 | Cr 31 | Cr 32 | Cr 33 | Cr 34 | Cr 35 | Cr 36 | Cr 37 |

⋮

| Cr 0637 | Cr 1637 | Cr 2637 | Cr 3637 |
|---|---|---|---|
| Cr 0638 | Cr 1638 | Cr 2638 | Cr 3638 |
| Cr 0639 | Cr 1639 | Cr 2639 | Cr 3639 |

EVEN 0
ODD 1
EVEN 2
ODD 3
...
ODD 1079

FIG. 4C

| | | | | | | | | | | | | | |
|---|---|---|---|---|---|---|---|---|---|---|---|---|---|
| Cb 00 | Cb 01 | Cb 02 | Cb 03 | Cb 04 | Cb 05 | Cb 06 | Cb 07 | | Cb 0637 | Cb 0638 | Cb 0639 | | |
| Cb 10 | Cb 11 | Cb 12 | Cb 13 | Cb 14 | Cb 15 | Cb 16 | Cb 17 | | Cb 1637 | Cb 1638 | Cb 1639 | | |
| Cb 20 | Cb 21 | Cb 22 | Cb 23 | Cb 24 | Cb 25 | Cb 26 | Cb 27 | | Cb 2637 | Cb 2638 | Cb 2639 | | |
| Cb 30 | Cb 31 | Cb 32 | Cb 33 | Cb 34 | Cb 35 | Cb 36 | Cb 37 | | Cb 3637 | Cb 3638 | Cb 3639 | | |

EVEN 0
ODD 1
EVEN 2
ODD 3
...
ODD 1079

FIG. 5A

| | EVEN 0 | ODD 1 | EVEN 2 | ODD 3 | ... | ODD 239 |
|---|---|---|---|---|---|---|
| | Y 01 | | | | | |
| | | Y 10 | | Y 30 | | |
| | | Y 21 | | | | |
| | | Y 12 | Y 32 | | | |
| | Y 03 | | Y 23 | | | |
| | | Y 14 | | Y 34 | | |
| | Y 05 | | Y 25 | | | |
| | | Y 16 | | Y 36 | | |
| | Y 07 | | Y 27 | | | |
| ⋮ | | | | | | |
| | Y 0637 | | Y 2637 | | | |
| | | Y 1638 | | Y 3638 | | |
| | Y 0639 | | Y 2639 | | | |

FIG. 5B

| | EVEN 0 | ODD 1 | EVEN 2 | ODD 3 | ... | ODD 239 |
|---|---|---|---|---|---|---|
| | | Cr 10 | | Cr 30 | | |
| | Cr 01 | | Cr 21 | | | |
| | | Cr 12 | | Cr 32 | | |
| | Cr 03 | | Cr 23 | | | |
| | | Cr 14 | | Cr 34 | | |
| | Cr 05 | | Cr 25 | | | |
| | | Cr 16 | | Cr 36 | | |
| | Cr 07 | | Cr 27 | | | |
| ⋮ | | | | | | |
| | Cr 0637 | | Cr 2637 | | | |
| | | Cr 1638 | | Cr 3638 | | |
| | Cr 0639 | | Cr 2639 | | | |

FIG. 5C

| | EVEN 0 | ODD 1 | EVEN 2 | ODD 3 | ... | ODD 239 |
|---|---|---|---|---|---|---|
| | | Cb 10 | | Cb 30 | | |
| | Cb 01 | Cb 21 | | | | |
| | | Cb 12 | Cb 32 | | | |
| | Cb 03 | Cb 23 | | | | |
| | | Cb 14 | Cb 34 | | | |
| | Cb 05 | Cb 25 | | | | |
| | | Cb 16 | Cb 36 | | | |
| | Cb 07 | Cb 27 | | | | |
| ⋮ | | | | | | |
| | Cb 0637 | Cb 2637 | | | | |
| | | Cb 1638 | Cb 3638 | | | |
| | Cb 0639 | Cb 2639 | | | | |

FIG. 6A

| | | | | | | | | | | | | |
|---|---|---|---|---|---|---|---|---|---|---|---|---|
| EVEN 0 | | | R 01 | G 01 | B 01 | | | | R 03 | G 03 | B 03 | |
| ODD 1 | G 10 | B 10 | R 10 | | | | G 12 | B 12 | R 12 | | | |
| EVEN 2 | | | R 21 | G 21 | B 21 | | | | R 23 | G 23 | B 23 | |
| ODD 3 | G 30 | B 30 | R 30 | | | | G 32 | B 32 | R 32 | | | |

... R 0639 G 0639 B 0639 ... G 1638 B 1638 R 1638 ... R 2639 G 2639 B 2639 ... G 3638 B 3638 R 3638

ODD 239

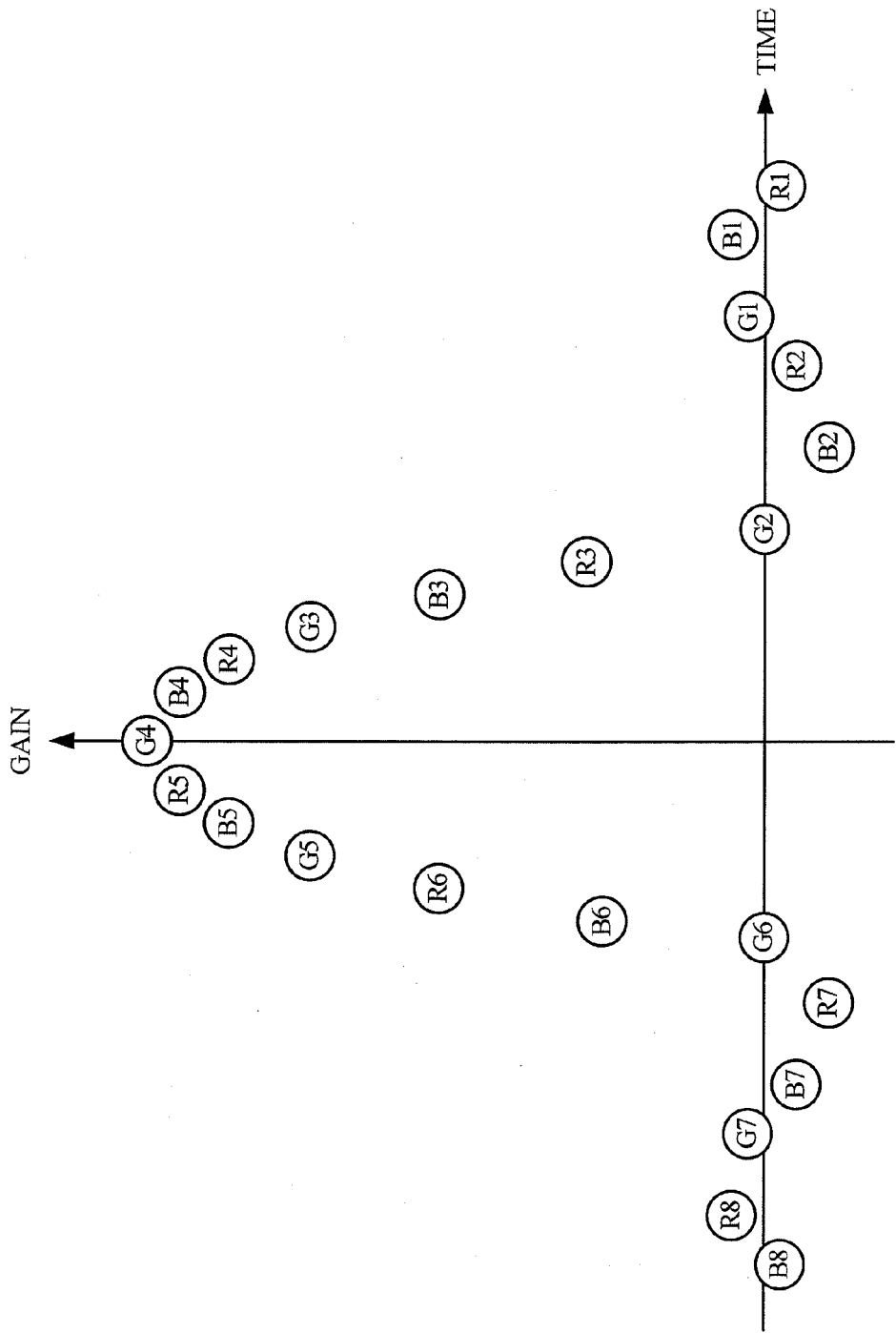

FIG. 8A

| | EVEN 0 | ODD 1 | EVEN 2 | ODD 3 | | ODD 239 |
|---|---|---|---|---|---|---|
| | Y 00 | | Y 02 | | Y 04 | | Y 06 | | | |
| | | Y 11 | | Y 13 | | Y 15 | | Y 17 | | |
| | Y 20 | | Y 22 | | Y 24 | | Y 26 | | | |
| | | Y 31 | | Y 33 | | Y 35 | | Y 37 | | |
| ⋮ |
| | | | | | | | Y 1637 | | Y 0638 | | Y 1639 | | | |
| | | | | | | | Y 3637 | | Y 2638 | | Y 3639 | | | |

FIG. 8B

| | EVEN 0 | ODD 1 | EVEN 2 | ODD 3 | ... | ODD 239 |
|---|---|---|---|---|---|---|
| | Cr 00 | | Cr 20 | | | |
| | | Cr 11 | | Cr 31 | | |
| | Cr 02 | | Cr 22 | | | |
| | | Cr 13 | | Cr 33 | | |
| | Cr 04 | | Cr 24 | | | |
| | | Cr 15 | | Cr 35 | | |
| | Cr 06 | | Cr 26 | | | |
| | | Cr 17 | | Cr 37 | | |
| ⋮ | | | | | | |
| | | Cr 1637 | | Cr 3637 | | |
| | Cr 0638 | | Cr 2638 | | | |
| | | Cr 1639 | | Cr 3639 | | |

FIG. 8C

| | EVEN 0 | ODD 1 | EVEN 2 | ODD 3 | ... | ODD 239 |
|---|---|---|---|---|---|---|
| | Cb 00 | Cb 11 | Cb 20 | Cb 31 | | |
| | Cb 02 | Cb 13 | Cb 22 | Cb 33 | | |
| | Cb 04 | Cb 15 | Cb 24 | Cb 35 | | |
| | Cb 06 | Cb 17 | Cb 26 | Cb 37 | | |
| | ⋮ | | | | | |
| | | Cb 1637 | | Cb 3637 | | |
| | Cb 0638 | | Cb 2638 | | | |
| | | Cb 1639 | | Cb 3639 | | |

IMAGE SIGNAL PROCESSING APPARATUS, IMAGE SIGNAL PROCESSING METHOD, AND PROGRAM

BACKGROUND OF THE INVENTION

1. Field of the Invention

The present invention relates to an image signal processing apparatus, an image signal processing method, and a program and, more particularly, to an apparatus, a method, and a program regarding a processing for displaying an image signal.

2. Description of the Related Art

A video camera for photographing a moving image and recording and reproducing the photographed moving image onto/from a recording medium has been known in the related art. Generally, the video camera is arranged to have a display apparatus such as a liquid crystal display (hereinbelow, also abbreviated to an LCD) or the like, so that and an image of a photographed object or an image reproduced from the recording medium is displayed on the display apparatus. In recent years, a video camera in which a high resolution moving image called a full high-definition, constructed by 1920 pixels in a horizontal direction×1080 pixels in a vertical direction per frame is photographed and recorded has also been put into practical use.

The liquid crystal display has such a structure that color filters (pixels) of RGB are regularly arranged. As a pixel arrangement of the LCD, for example, a stripe arrangement in which the RGB pixels are arranged in a line every column in the vertical direction of a display screen and a delta arrangement in which the RGB pixels are arranged so as to be deviated in the horizontal direction every other line by 1.5 pixels have been known. A video camera using a liquid crystal panel of the delta arrangement is also known (for example, refer to Japanese Patent Application Laid-Open No. 2007-096472).

In commercially available apparatuses such as video camera, digital camera, and the like, a liquid crystal display having pixels of about QVGA (320 pixels in the horizontal direction×240 pixels in the vertical direction) is often used because of limitations of a miniaturization, costs, and the like. For this reason, the number of pixels of the photographed image is reduced and the reduced image is displayed.

However, if the image to be displayed is an image having a number of pixels such as a full high-definition image, a ratio between the number of pixels of the image which is displayed and the number of pixels of a display is large. Therefore, if the number of pixels is merely reduced by thinning out the pixels, image quality deteriorates due to aliasing noises or the like.

To prevent such a deterioration, there is such a problem that a processing circuit such as a high precision interpolation filter or the like is necessary and it results in an increase in circuit scale and costs.

It is an aspect of the invention to solve the above problems.

It is another aspect of the invention to provide an image signal processing apparatus which can display a high resolution image on the display having the pixels the number of which is less than that of the high resolution image while suppressing an increase in circuit scale and costs.

SUMMARY OF THE INVENTION

According to an aspect of the invention, an image signal processing apparatus of the present invention, for outputting an image signal to a display apparatus having a predetermined pixel arrangement of n pixels in a horizontal direction and m pixels in a vertical direction (n and m are natural numbers, respectively), comprises: an input unit configured to input the image signal composed of a luminance signal and color difference signals; a memory; a first conversion unit configured to convert the number of pixels in the horizontal direction of the input image signal into 2n pixels and store the image signal in which the number of pixels has been converted into the memory; a second conversion unit configured to read out the image signal stored in the memory by the first conversion unit and sample the pixels of the read-out image signal in accordance with the predetermined pixel arrangement of the display apparatus, thereby converting the number of pixels in the horizontal direction of the read-out image signal into n pixels and converting the number of pixels in the vertical direction of the read-out image signal into m pixels; a color conversion unit configured to convert the image signal output from the second conversion unit into a plurality of color component signals corresponding to the pixels of the display apparatus; and a correction unit configured to correct a center of gravity of each of the plurality of color component signals output from the color conversion unit in accordance with the predetermined pixel arrangement of the display apparatus and output the color component signals in each of which the center of gravity is corrected to the display apparatus.

Further features of the present invention will become apparent from the following description of exemplary embodiments with reference to the attached drawings.

BRIEF DESCRIPTION OF THE DRAWINGS

FIG. 3 a diagram illustrating a pixel arrangement of a display.

FIGS. 4A, 4B, and 4C are diagrams each illustrating pixel positions of a moving image signal converted by a horizontal direction conversion unit of the display control unit in FIGS. 2A and 2B.

FIGS. 5A, 5B, and 5C are diagrams each illustrating pixel positions of a moving image signal sampled by a vertical direction conversion unit of the display control unit in FIGS. 2A and 2B.

FIGS. 6A and 6B are diagrams each illustrating pixel positions and a center of gravity of each pixel of color component signals of RGB converted by an RGB conversion unit in FIGS. 2A and 2B.

FIGS. 7A and 7B are diagrams illustrating a construction and frequency characteristics of an over sampling filter of a gravity correction unit in FIGS. 2A and 2B.

FIGS. 8A, 8B, and 8C are diagrams each illustrating pixel positions of the moving image signal sampled by the vertical direction conversion unit of the display control unit in FIGS. 2A and 2B in the case of a reverse display.

FIGS. 9A and 9B are diagrams each illustrating pixel positions and a center of gravity of each pixel of the color component signals of RGB converted by the RGB conversion unit in FIGS. 2A and 2B.

DESCRIPTION OF THE EMBODIMENTS

Exemplary embodiments of the present invention will now be described in accordance with the accompanying drawings.

Figure 1:
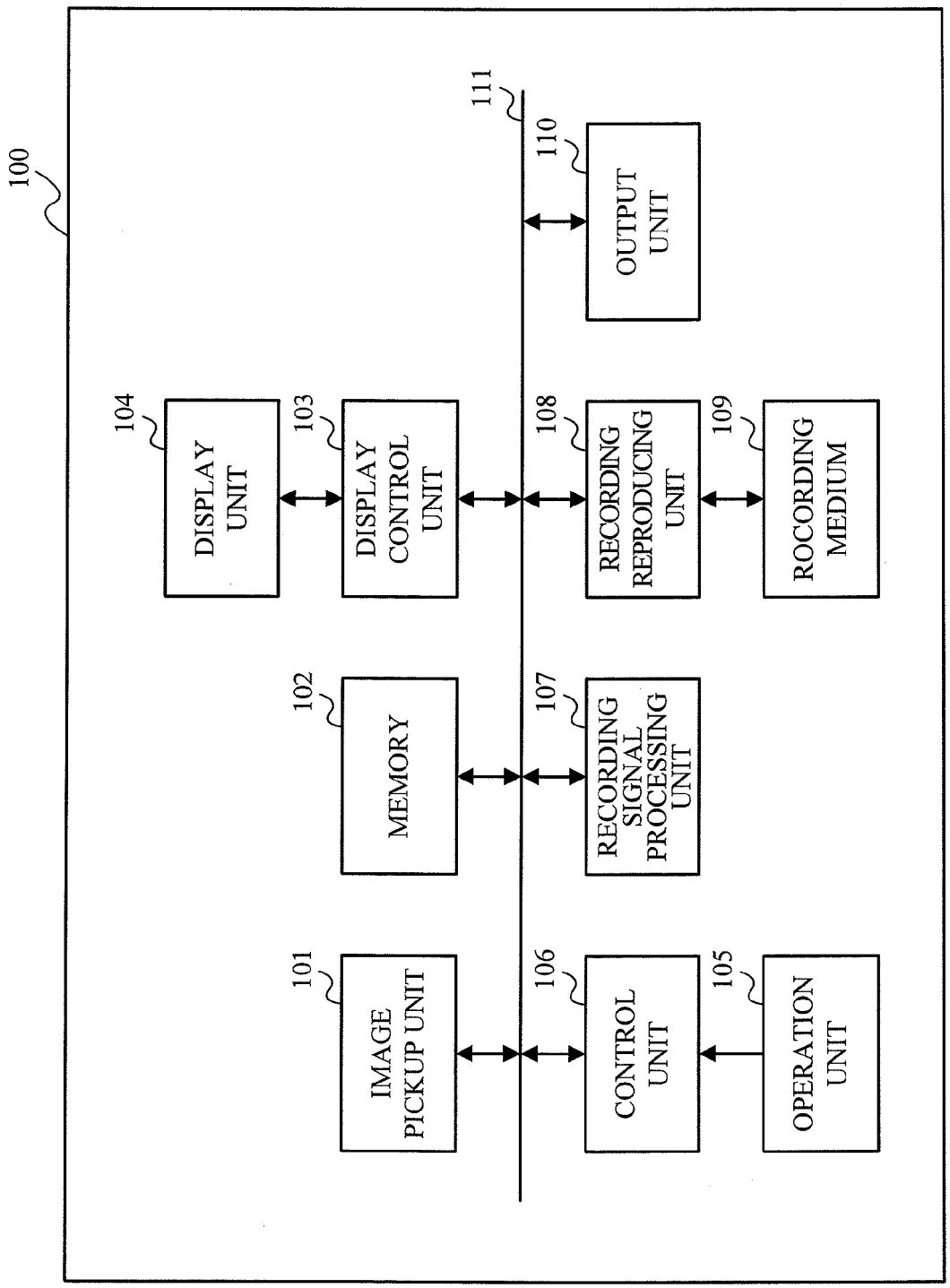
FIG. 1 is a diagram illustrating a construction of a video camera in an embodiment of the invention.

FIG. 1 is a diagram illustrating a construction of a video camera 100 as an embodiment of the invention. The invention is not limited to the camera having an image pickup unit but, naturally, can be also applied to another apparatus having a display unit of a smaller number of pixels for displaying an obtained image of a larger number of pixels, such as personal computer (PC) or cellular phone.

In FIG. 1, an image pickup unit 101 photographs an object and outputs moving image data. In the embodiment, the image pickup unit 101 outputs a moving image signal in which one frame is constructed by 1920 pixels in the horizontal direction×1080 pixels in the vertical direction and which has 60 frames per second. A memory 102 stores the moving image signal obtained by the image pickup unit 101, an encoded moving image signal, an image signal which is processed by a display control unit 103, an on-screen display signal (OSD signal) which is multiplexed to a moving image and displayed, or the like. The display control unit 103 displays an image regarding the moving image signal obtained by the image pickup unit 101 on a display unit 104 on a photographing operation and displays an image regarding the moving image signal reproduced in a reproduction operation. The display control unit 103 multiplexes various kinds of OSD information such as a menu screen and the like to the image and displays a resultant image on the display unit 104.

The display unit 104 has a liquid crystal display and a display driver and displays the image in accordance with the image signal output from the display control unit 103. In the embodiment, the LCD in the display unit 104 is the one of the delta arrangement and the number of pixels is equal to 320 pixels in the horizontal direction×240 pixels in the vertical direction. The display of the display unit 104 has pixels corresponding to three kinds of color components of red, green and blue (RGB) and has 320 pixels in the horizontal direction with respect to each pixel of RGB. An aspect of each pixel of the display of the display unit 104 is set to (lateral 1:vertical 180/240)=4:3.

A pixel arrangement of the LCD is illustrated in FIG. 3. A stripe arrangement 301 and a delta arrangement 302 are illustrated. As illustrated at 302, in the delta arrangement, the pixels of RGB are arranged so as to be deviated every other line by 1.5 pixels. Although the embodiment relates to an example in which the invention is applied to the display apparatus whose pixel arrangement is the delta arrangement, the invention can be also properly applied to a display apparatus whose pixel arrangement is the stripe arrangement as will be described hereinafter.

In the embodiment, the display unit 104 is arranged so as to be rotatable to a main body of the video camera 100. The user can set the direction of the display unit 104 so as to face the photographer and can also set the direction of the display unit 104 so as to face the object by rotating the display unit 104. If the display unit 104 is rotated so as to face the object, since upper and lower positions of the display unit 104 are reversed, the vertical direction of the image is reversed and the image is displayed.

An operation unit 105 has a power switch, an instruction switch to instruct the start/stop of the photographing, a mode switch to change over a photographing mode and a reproducing mode, a switch for operating a menu display screen, and the like. A control unit 106 has a microcomputer and controls each unit of the video camera 100 in accordance with a program stored in a memory (not shown). The control unit 106 controls each unit in response to an instruction from the operation unit 105. The control unit 106 forms OSD information in accordance with control of the program and stores into the memory 102.

Upon recording, a recording signal processing unit 107 executes a predetermined processing to the full high-definition moving image signal obtained by the image pickup unit 101 and encodes the processed signal in accordance with a well-known encoding method such as H.264 method or the like. Upon reproduction, the processing unit 107 decodes the reproduced moving image signal.

A recording reproducing unit 108 records the moving image signal in a recording medium 109 and reproduces the moving image signal from the recording medium 109. The recording medium 109 is a random-accessible recording medium such as a flash memory card or the like. The recording medium 109 can be easily exchanged to the video camera 100 by a loading/ejecting mechanism (not shown). The recording reproducing unit 108 manages various kinds of data, as files, which are recorded in the recording medium 109 in accordance with a well-known file system such as an FAT file system or the like. An output unit 110 outputs the moving image signal obtained by the image pickup unit 101 or the reproduced moving image signal to an external display apparatus or the like of the video camera 100. The output unit 110 synthesizes the OSD signal to the moving image signal which is output to the outside and outputs a synthesized signal in response to an instruction from the control unit 106. A data bus 111 transmits and receives data and commands to/from each unit.

First, the operation upon photographing will be described. When a power source is turned on by the operation unit 105, the moving image signal obtained by the image pickup unit 101 is stored into the memory 102 through the bus 111. The display control unit 103 reduces the number of pixels of each frame in the moving image signal stored in the memory 102 in accordance with the number of pixels of the display unit 104 as will be described hereinafter and displays the moving image regarding the photographed object on the display unit 104.

When a recording start instruction is issued from the operation unit 105 in such a recording pause state, the recording signal processing unit 107 sequentially reads out the moving image signal stored in the memory 102 in an order suitable for the encoding processing. The recording signal processing unit 107 encodes the moving image signal read out of the memory 102 in accordance with the H.264/MPEG4 AVC method and stores again into the memory 102. The control unit 106 stores various kinds of control information and the like into the memory 102 and multiplexes to the encoded moving image signal, thereby generating stream data. The recording reproducing unit 108 reads out the data from the memory 102 in accordance with a fact that the stream data of a predetermined amount is accumulated into the memory 102 and records in the recording medium 109.

After that, similar processings are continued for a period of time until a recording stop instruction is issued. When the recording stop instruction is issued, the recording of the data to the recording medium 109 is stopped. In the embodiment, data (clips) of a series of scenes recorded in the recording medium 109 for a period of time from the recording start instruction to the recording stop instruction is managed as one moving image file on the recording medium. The recording reproducing unit 108 generates management information for managing the data such as moving image file and the like recorded in the recording medium 109 in response to an instruction of the control unit 106 and records the management information into a predetermined area in the recording medium. The recording reproducing unit 108 updates the management information recorded in the recording medium 109 each time a moving image file is generated and recorded.

Subsequently, the operation upon reproduction will be described. In the present embodiment, an index display screen (which will be described hereinafter) showing a list of representative images of the clips (scenes) recorded in the recording medium 109 is displayed. A desired scene is selected from the representative images. When an instruction to change over to the reproducing mode is issued from the operation unit 105, the control unit 106 displays the index display screen of each moving image file recorded in the recording medium 109 to the display unit 104. When an index display instruction is issued, the recording reproducing unit 108 reads out a head portion of each moving image file recorded in the recording medium 109 and stores into the memory 102. The recording signal processing unit 107 decodes the head portion of each moving image file stored in the memory 102 and stores the head display screen into the memory 102. The display control unit 103 reduces the head display screen of each moving image file and stores into the memory 102. The control unit 106 generates an index display screen constructed by the reduced display screens stored in the memory 102 and outputs on the display control unit 103. The display control unit 103 displays the index display screen to the display unit 104. The user operates the operation unit 105 and selects a representative image of a desired clip among the representative images displayed on the display unit 104.

The control unit 106 controls the recording reproducing unit 108 on the basis of the management information recorded in the recording medium 109 and reproduces the moving image file corresponding to the representative image selected by the user from the recording medium 109. The reproduced moving image signal is temporarily stored into the memory 102. The recording signal processing unit 107 reads out the moving image signal from the memory 102, decodes it, and sends the decoded signal to the memory 102. The moving image signal stored in the memory 102 is converted into a format adapted to a display format of an external monitor or the like by the output unit 110 and is output. The display control unit 103 displays the moving image corresponding to the moving image signal stored in the memory 102 to the display unit 104 in place of the index display screen.

Subsequently, the display control unit 103 will be described. The display control unit 103 converts the number of pixels of the photographed moving image signal or the reproduced moving image signal in accordance with the number of pixels (size) of the liquid crystal display apparatus of the display unit 104. The display control unit 103 corrects a center of gravity of each pixel of the moving image signal serving as a display target in accordance with the delta arrangement as a pixel arrangement of the LCD of the display unit 104 and outputs the corrected moving image signal to the display unit 104.

Figure 2A:
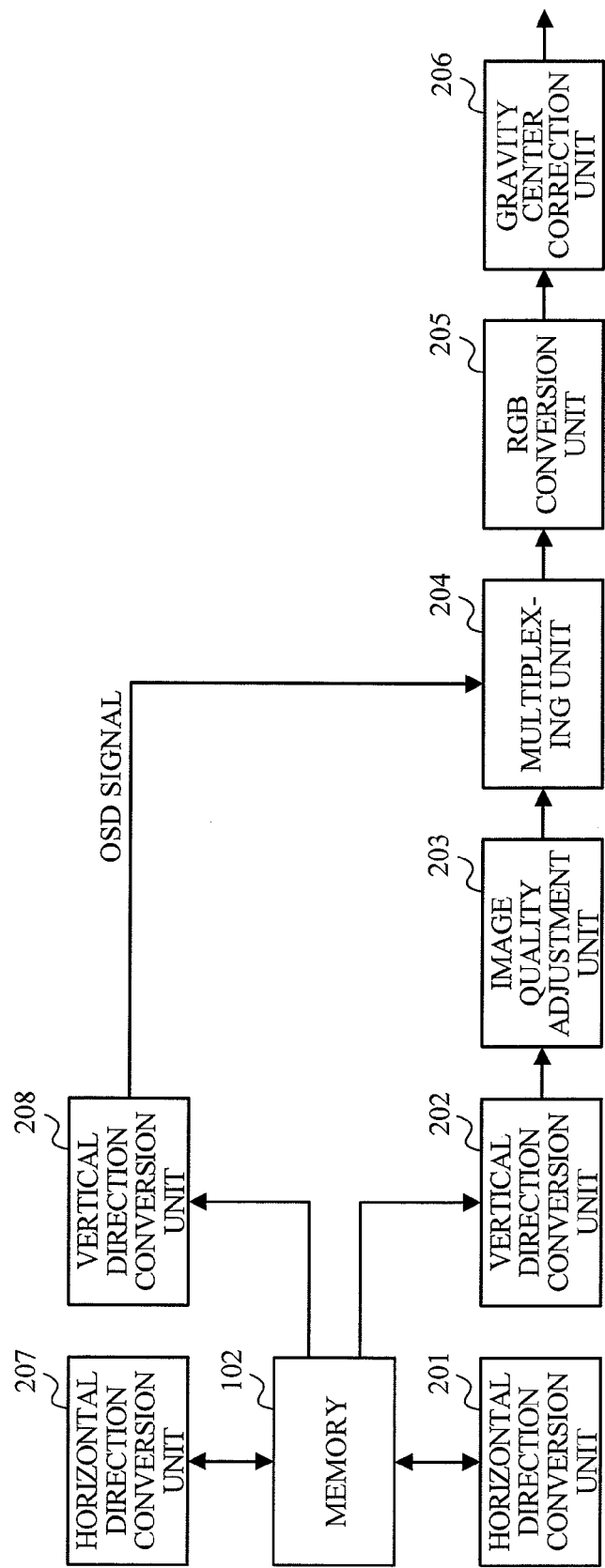
FIGS. 2A and 2B are diagrams each illustrating a construction of a display control unit of the video camera in FIG. 1.

FIG. 2A is a diagram illustrating a construction of a main part of the display control unit 103. In FIG. 2A, a horizontal direction conversion unit 201 reads out from the memory 102 the moving image signal output from the image pickup unit 101 and stored into the memory 102 or reproduced from the recording medium 109 by the recording reproducing unit 108 and then stored into the memory 102, reduces the number of pixels in the horizontal direction, and stores the reduced moving image signal into the memory 102. Each of the moving image signal output from the image pickup unit 101 and the reproduced moving image signal is a signal of a frame constructed by 1920 pixels in the horizontal direction and 1080 pixels in the vertical direction.

Each of the moving image signal from the image pickup unit 101 and the reproduced moving image signal is constructed by a luminance signal Y and two (a plurality of) color difference signals Cr and Cb. In the embodiment, in the moving image signal from the image pickup unit 101 and the reproduced moving image signal, a ratio between the pixels of the luminance signal Y and the pixels of the color difference signals Cr and Cb is equal to 2:1. That is, the color difference signals Cr and Cb are output as a signal which is sampled every other pixel to the luminance signal Y of each horizontal line, and are stored into the memory 102. Therefore, the number of horizontal pixels of the luminance signal Y in the moving image signal from the image pickup unit 101 or the reproduced moving image signal is equal to 1920 pixels and the number of horizontal pixels of each of the color difference signals Cr and Cb is equal to 960 pixels.

Specifically speaking, the horizontal direction conversion unit 201 has a band limiting filter and a sub-sampling circuit, reads out the moving image signal stored in the memory 102, and limits its frequency band. With respect to each of the luminance signal Y and the color difference signals Cr and Cb, the number of pixels in the horizontal direction is converted into 640 pixels which is twice as large as 320 pixels which is the number of horizontal pixels of the LCD in the display unit 104.

In the present embodiment, 1920 pixels which is the number of horizontal pixels of the original moving image signal from the image pickup unit 101 are converted into 320 pixels which is 1/6 of 1920 pixels, in accordance with the number of pixels of the LCD. In the embodiment, the number of horizontal pixels is not directly converted from 1920 pixels into 320 pixels but is temporarily converted into 640 pixels which is twice as large as 320 pixels which is the number of horizontal pixels of the display, in order to generate the moving image suitable for the display of the delta arrangement. At this time, a cut-off frequency of a low-pass filter (LPF) serving as a band limiting filter for thinning out the pixels is set to a value within a range from 1/6 to 1/3 of a frequency of the moving image signal from the image pickup unit 101. Ordinarily, in the case of reducing the number of pixels to 1/6, a frequency band is also limited to 1/6 by using a low pass filter. However, it is set to a band within a range from 1/6 to 1/3 in the embodiment. 1/6 is a ratio of the number of horizontal pixels of the display to the number of horizontal pixels of the input moving image signal. 1/3 is a ratio of the number of pixels which is twice as large as the number of horizontal pixels of the display to the number of pixels of the input moving image signal. As mentioned above, the frequency higher than the frequency obtained by multiplying the frequency of the input image by the ratio between the number of horizontal pixels of the input image and the number of display pixels is set as a limiting frequency band of the band limiting filter. Thus, the aliasing noises can be reduced while raising a resolution of the moving image which is displayed to the display. The limiting frequency band of the band limiting filter in the horizontal direction conversion unit 201 can be changed by an instruction from the control unit 106.

After the band limitation is performed as mentioned above, the horizontal direction conversion unit 201 reducing the pixels of the moving image signal, thereby converting the number of horizontal pixels into 640 pixels (first conversion). With respect to the luminance signal Y, 1920 pixels are converted into 640 pixels by thinning out 2 pixels from every 3 pixels. With respect to the color difference signals Cr and Cb, after 960 pixels which is the number of horizontal pixels of the input moving image signal are temporarily converted into 1920 pixels which the number of pixels equal to twice as large as 960 pixels, the band of the signal is limited by the band limiting filter and, subsequently, the pixels are converted into 640 pixels by thinning out 2 pixels from every 3 pixels. The horizontal direction conversion unit 201 stores the moving image signal in which the number of pixels is converted into the memory 102. As mentioned above, the moving image signal from the horizontal direction conversion unit 201 becomes a signal of 640 horizontal pixels×1080 vertical pixels.

A frame of the moving image signal from the horizontal direction conversion unit 201 is illustrated in each of FIGS. 4A to 4C. FIG. 4A illustrates the frame of the luminance signal Y. FIGS. 4B and 4C illustrate the frames of the color difference signals Cr and Cb, respectively. A numeral of each pixel in FIGS. 4A to 4C indicates a position of each pixel in the frame. As illustrated in FIGS. 4A to 4C, in the moving image signal from the horizontal direction conversion unit 201, the luminance signal Y and the color difference signals Cr and Cb exist at the same positions.

Subsequently, a vertical direction conversion unit 202 reads out the moving image signal in which the number of horizontal pixels is converted into 640 pixels by the horizontal direction conversion unit 201, from the memory 102. The vertical direction conversion unit 202 further reduces the number of pixels in the horizontal direction of the read-out moving image signal into ½ while maintaining the band thereof and, thereafter, reduces the number of pixels in the vertical direction into 240 pixels in accordance with the number of pixels of the display, and outputs the reduced moving image signal to an image quality adjustment unit 203 (second conversion).

In the embodiment, when the vertical direction conversion unit 202 converts the number of horizontal pixels of the moving image signal read out from the memory 102 into ½, the positions of the pixels to be sampled are predetermined in accordance with the pixel arrangement of the display. That is, as illustrated in FIGS. 5A to 5C, with respect to each of the luminance signal Y and the color difference signals Cr and Cb, the sampling positions in the horizontal direction are deviated every line in accordance with the delta arrangement 302 in FIG. 3. FIG. 5A illustrates the sampling positions of the luminance signal Y. As will be obvious from FIG. 5B, with respect to the even lines 0, 2, . . . , the pixels are sampled every other pixel like the second pixel, the fourth pixel, the sixth pixel, . . . . On the other hand, with respect to the odd lines 1, 3, . . . , the pixels are sampled every other pixel like the first pixel, the third pixel, the fifth pixel, . . . . In this manner, the positions of the pixels which are sampled in the even lines and those in the odd lines differ. In a manner similar to FIG. 5A, FIGS. 5B and 5C also illustrate the sampling positions of the color difference signals Cr and Cb. If the pixel arrangement of the display unit 104 is the stripe arrangement, it is sufficient to set the same sampling positions with respect to all lines.

The vertical direction conversion unit 202 has a band limiting filter in the vertical direction and a spatial filter for pixel interpolation. The vertical direction conversion unit 202 limits a frequency band in the vertical direction by the band limiting filter to the moving image signal which is sampled as mentioned above. In order to convert 1080 pixels into 240 pixels, a cut-off frequency of the band limiting filter is set to ⅔ of that of the original moving image signal. Further, the vertical direction conversion unit 202 executes the pixel interpolation for converting 1080 pixels which is the number of pixels in the vertical direction into 240 pixels by the spatial filter and, subsequently, converts 1080 pixels which is the number of pixels in the vertical direction into 240 pixels by thinning out the pixels in the vertical direction. The moving image signal converted as mentioned above is output to the image quality adjustment unit 203.

The image quality adjustment unit 203 executes a predetermined image processing to the moving image signal from the vertical direction conversion unit 202 in accordance with an instruction from the control unit 106. For example, if an instruction to brighten a part of the display screen is issued from the control unit 106, the pixels at the designated positions are changed in accordance with the instruction. The moving image signal processed by the image quality adjustment unit 203 is output to a multiplexing unit 204. If the invention is applied to an apparatus without the generating and displaying functions of the OSD signal like a video camera of the embodiment, it is sufficient to set the multiplexing unit so that the image signal is output as it is. Even if the construction and the multiplexing unit regarding the OSD signal processing are properly eliminated to generate the image signal of the invention, the effects of the invention are not lost.

Subsequently, the processings of the OSD signal will be described. The OSD signal generated by the control unit 106 is stored in the memory 102. In the embodiment, the number of pixels of one frame of the OSD signal is set to 960 horizontal pixels×540 vertical pixels corresponding respectively to ½ of the number of horizontal pixels and the number of vertical pixels of the moving image signal from the image pickup unit 101. The OSD signal is constructed by the luminance signal Y and the color difference signals Cr and Cb. It is assumed that the number of pixels of one frame of the OSD signal is set to be identical with respect to both of the luminance signal Y and the color difference signals Cr and Cb. In the case of synthesizing the OSD signal of the moving image signal by the output unit 110, the number of pixels of the OSD signal stored in the memory 102 is increased to the value which is twice as large as the original number in each of the horizontal direction and the vertical direction and, thereafter, the increased OSD signal is synthesized.

A horizontal direction conversion unit 207 reads out the OSD signal from the memory 102 in response to an instruction from the control unit 106 and temporarily converts the number of pixels in the horizontal direction into 1920 pixels. The horizontal direction conversion unit 207 has a band limiting filter, limits a frequency band of the OSD signal converted into 1920 pixels, thereafter, converts the number of pixels in the horizontal direction into 640 pixels, and stores into the memory 102 (third conversion).

A limiting frequency of the band limiting filter in the horizontal direction conversion unit 207 is the same as that of the band limiting filter in the horizontal direction conversion unit 201. Since there is also a case where the user wants that the OSD signal appears with sense of resolution different from that of the moving image, it may be constructed in such a manner that a limiting frequency of the OSD signal can be set by the control unit 106 separately from the moving image signal. The OSD signal in which the number of pixels is converted by the horizontal direction conversion unit 207 has 640 horizontal pixels×540 vertical pixels, so that it is similar to the states of FIGS. 4A to 4C except that the number of vertical pixels is 540 pixels.

Subsequently, a vertical direction conversion unit 208 reads out the OSD signal in which the number of horizontal pixels is converted into 640 pixels by the horizontal direction conversion unit 207, from the memory 102. The vertical direction conversion unit 208 further reduces the number of pixels in the horizontal direction of the read-out OSD signal into ½ and, thereafter, reduces the number of pixels in the vertical direction into 240 pixels in accordance with the number of pixels of the display, and outputs the reduced OSD signal to multiplexing unit 204 (fourth conversion).

In a manner similar to the vertical direction conversion unit 202, when the vertical direction conversion unit 208 converts the number of horizontal pixels of the OSD signal into ½, the positions of the pixels to be sampled are determined in accordance with the pixel arrangement of the display. That is, as illustrated in FIGS. 5A to 5C, with respect to each of the luminance signal Y and the color difference signals Cr and Cb, the sampling positions in the horizontal direction are deviated between the adjacent lines every other line correspondingly to a fact that the pixel arrangement of the display unit 104 is the delta arrangement. If the pixel arrangement of the display unit 104 is the stripe arrangement, it is sufficient to apply the sampling positions same as those of the moving image signal with respect to all the lines.

The vertical direction conversion unit 208 has a band limiting filter in the vertical direction and a spatial filter for pixel interpolation. The vertical direction conversion unit 208 limits a frequency band of the OSD signal which is sampled as mentioned above, in the vertical direction by the band limiting filter.

In order to convert 540 pixels which is the number of vertical pixels into 240 pixels, a cut-off frequency of the band limiting filter is set to 4/9 of that of the original moving image signal. Further, the vertical direction conversion unit 208 executes the pixel interpolation for converting 540 pixels which is the number of pixels in the vertical direction into 240 pixels by the spatial filter and, subsequently, converts 540 pixels which is the number of pixels in the vertical direction into 240 pixels by thinning out the pixels in the vertical direction. The OSD signal converted as mentioned above is output to the multiplexing unit 204.

In response to an instruction from the control unit 106, the multiplexing unit 204 multiplexes the moving image signal from the image quality adjustment unit 203 and the OSD signal from the vertical direction conversion unit 208 and outputs the multiplexed signal to an RGB conversion unit 205. In accordance with a ratio instructed from the control unit 106, the multiplexing unit 204 sets a synthesization ratio (rate) to each pixel between the moving image signal and the OSD signal.

In response to an instruction from the control unit 106, the RGB conversion unit 205 converts the luminance signal Y and the color difference signals Cr and Cb of the moving image signal output from the multiplexing unit 204 into three kinds of color component signals of R (red), G (green), and B (blue). In accordance with a conversion matrix output from the control unit 106, the RGB conversion unit 205 converts the luminance signal and the color difference signals into RGB signals. The RGB conversion unit 205 generates each pixel of the RGB signals by using the luminance signal Y and the color difference signals Cr and Cb existing at the same positions in the frame on the one pixel basis. That is, a set of luminance signal Y and color difference signals Cr and Cb existing at the same pixel positions is converted into a set of RGB signals (color conversion).

The moving image signal output from the RGB conversion unit 205 is illustrated in FIG. 6A. Since the pixels are sampled by the vertical direction conversion unit 202 in such a manner that the sampling positions in the horizontal direction are deviated every line, the sampling positions of the set of RGB signals are also deviated between the lines as illustrated in FIG. 6A.

A gravity center correction unit 206 corrects the center of gravity of each of the RGB pixels in the moving image signal output from the RGB conversion unit 205 so as to be equal to the center of gravity corresponding to the pixel arrangement of the display in the display unit 104. The gravity center correction unit 206 has an oversampling filter and corrects the center of gravity of each pixel by executing a filtering processing to each of the RGB pixels of the input moving image signal.

Figure 6B:
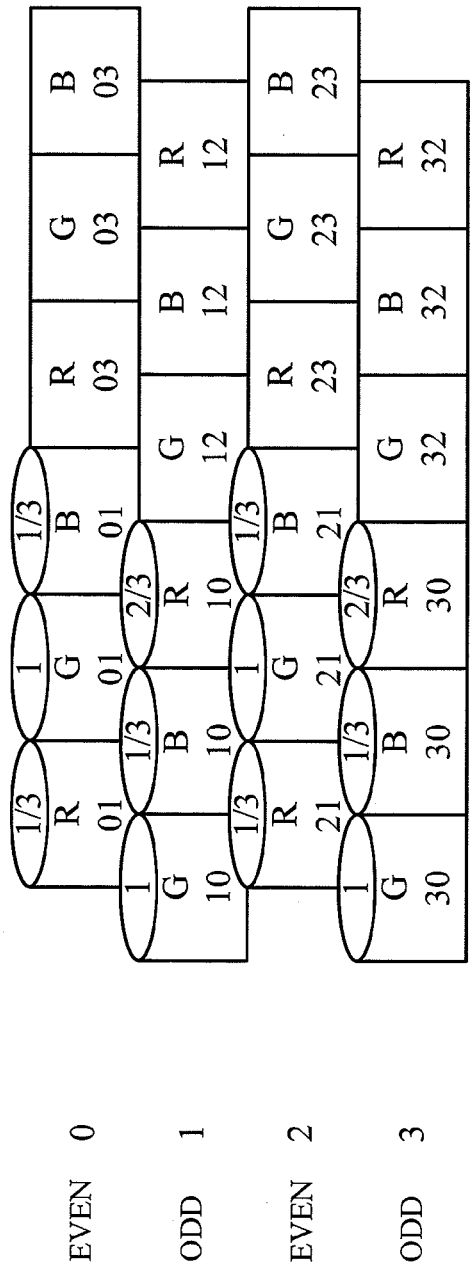

As a result of that the sampling positions in the horizontal direction are deviated between the lines as illustrated in FIG. 6A, the pixel positions of G (green) in the moving image signal output from the RGB conversion unit 205 correspond to the positions of G in the delta arrangement 302 shown in FIG. 3. This is because since the color whose luminance component is the main component is G, the importance is given to the positions of G in the sampling processing in the vertical direction conversion unit 202. Since the center of gravity of each pixel of G is already matched with the delta arrangement as mentioned above, the center of gravity of each pixel of R and B is corrected by using the center of gravity of G as a center by the gravity center correction unit 206. Specifically speaking, in the even lines, assuming that G is a center, the center of gravity of each pixel of both R and B adjacent to G is deviated by 1/3 pixel as illustrated in FIG. 6B. In the odd lines, since the pixels are arranged in order of GBR from the left side of the display screen, the center of gravity of B is deviated by 1/3 pixel from that of G and the center of gravity of R is deviated by 2/3 pixel from that of G.

Figure 7A:
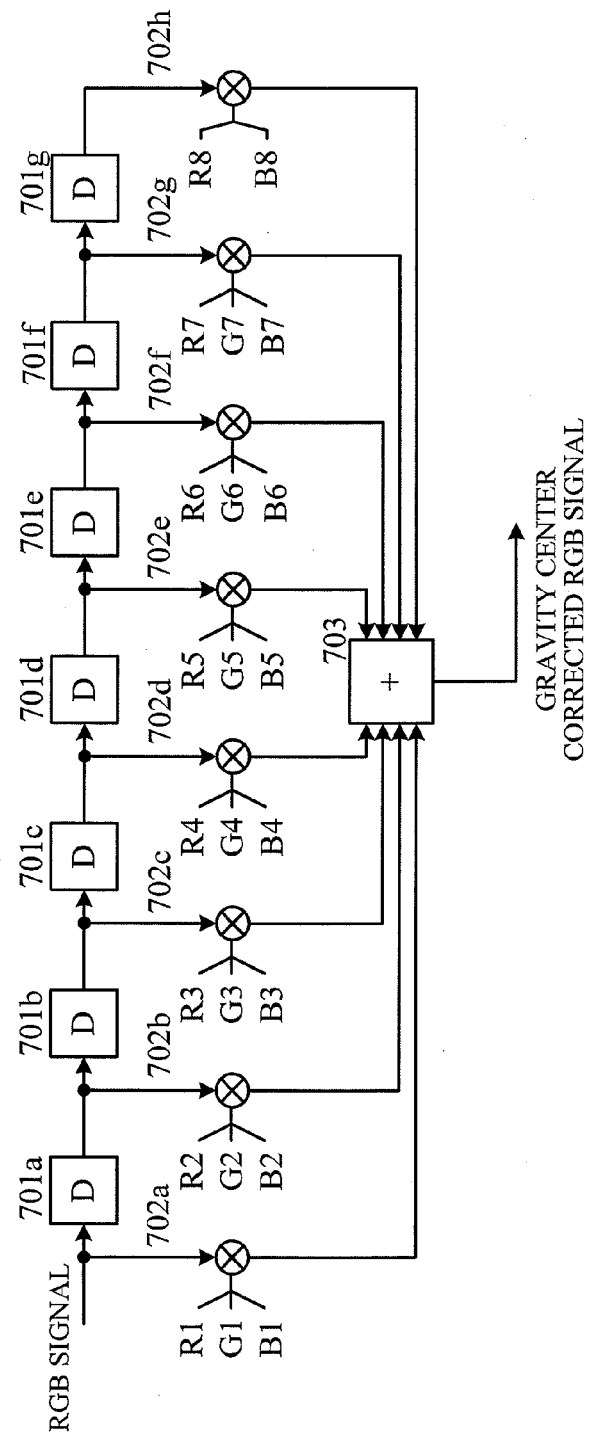

FIG. 7A illustrates the oversampling filter in the gravity center correction unit 206. FIG. 7B illustrates frequency characteristics of the oversampling filter. Each pixel in FIG. 7B corresponds to a pixel position which is output from each tap in the filter in FIG. 7A and a notation of each pixel corresponds to a tap coefficient. The characteristics of the filter in FIG. 7B are used to deviate the center of gravity of each pixel of R and B in accordance with the delta arrangement while setting G to a center. The total number of taps of the filter is equal to 23, the filter of R has eight filter arithmetic operation coefficients, the filter of G has seven filter arithmetic operation coefficients, and the filter of B has eight filter arithmetic operation coefficients.

The moving image signals of the respective RGB pixels from the RGB conversion unit 205 are sequentially input to the filter on the line basis. Delay units 701a to 701g sequentially delay the input moving image signals of the respective RGB pixels by a time corresponding to three pixels and output the delayed signals, respectively. Therefore, if the pixel input to the filter is the pixel of G, the pixel of G is output from each tap. Similarly, the pixel input to the filter is the pixel of B or R, the pixel of B or R is output. In response to an instruction from the control unit 106, each of multipliers 702a to 702h selects a coefficient and multiplies the signal from each tap by the selected coefficient. In the embodiment, if the pixel input to the filter is the pixel of G, control is made so that the multipliers 702a to 702h select coefficients G1 to G7, respectively. If the pixel input to the filter is the pixel of B or R, control is made so that the multipliers 702a to 702h select coefficients B1 to B8 or R1 to R8.

The adder 703 adds outputs from the multipliers and outputs an addition signal as a moving image signal of the RGB signals in which the center of gravity is corrected. The gravity-corrected moving image signal of RGB from the gravity center correction unit 206 is output to the display unit 104 as mentioned above.

When the pixel arrangement of the display unit 104 is the stripe arrangement, it is sufficient to properly change the setting of the gravity correction in accordance with the pixel arrangement of the display unit in a manner similar to the vertical direction conversion unit (for example, the setting of the filter coefficient is changed).

Figure 2B:
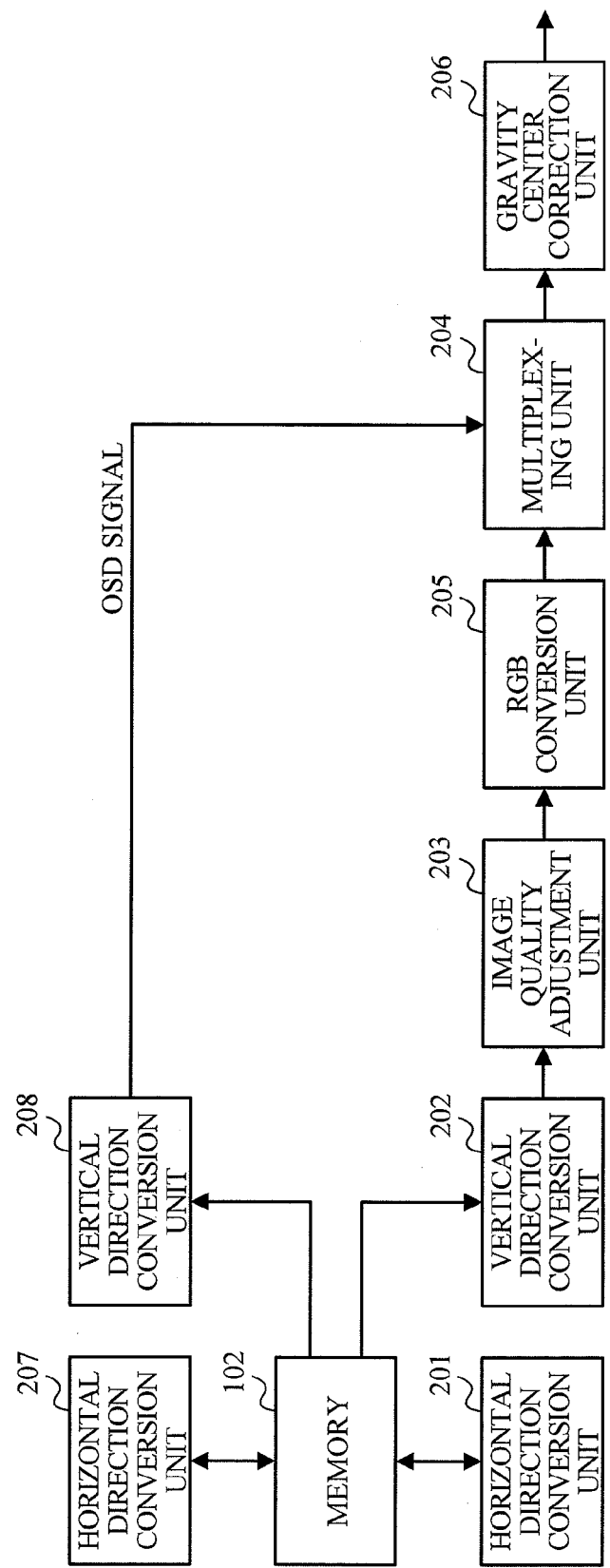

Although the OSD signal composed of the luminance signal and the color difference signals is generated in the embodiment, the OSD signal composed of the RGB signals may be generated. A construction of the display control unit 103 in the case where the OSD signal composed of the RGB signals is generated is illustrated in FIG. 2B. In this case, the OSD signal composed of the RGB signals of 960 horizontal pixels×540 vertical pixels is generated as an OSD signal. As for the OSD signal, it is now assumed that the number of horizontal pixels is equal to 960 pixels with respect to each of the color components of RGB.

The horizontal direction conversion unit 207 in FIG. 2B reads out the OSD signal composed of the RGB signals, from the memory 102 and converts the number of pixels in the horizontal direction into 640 pixels with respect to each of the color component signals of RGB. In this instance, in a manner similar to the case of the luminance signal and the color difference signals in FIG. 2A, after the OSD signal was temporarily converted into 1920 pixels, a band limitation is performed and those pixels are converted into 640 pixels. The vertical direction conversion unit 208 reads out the RGB signals in which the number of horizontal pixels is equal to 640 pixels, from the memory 102 and converts the number of pixels in the horizontal direction into 320 pixels in accordance with the number of horizontal pixels of the display. At this time, in a manner similar to the case of the luminance signal and the color difference signals, the sampling positions are deviated between the lines. After the band limitation is performed in the vertical direction to the sampled RGB signals, the number of pixels in the vertical direction is converted into 240 pixels in accordance with the number of pixels of the display and the converted RGB signals are output to the RGB conversion unit 205. The pixel positions of the RGB signals which are output from the vertical direction conversion unit 208 are arranged as illustrated in FIG. 6A.

After that, in a manner similar to that mentioned above, the OSD signal and the moving image signal are multiplexed by the multiplexing unit 204, the center of gravity of each pixel is corrected by the gravity center correction unit 206, and the corrected multiplexed signal is output.

Subsequently, processings in the case of rotating the display unit 104 and reversing the image to be displayed will be described. In the case where the display unit 104 is rotated so as to face the object, in the embodiment, the direction of the image to be displayed on the display unit 104 is reversed in the vertical direction and the reversed image is displayed. In the case of the reverse display, the top line of the moving image is displayed at the bottom line in a state of a normal display. In the embodiment, since the number of vertical pixels of the display is equal to 240 pixels, in the state of the normal display, the bottom line of the display is an odd line (line 239) in the horizontal direction. In the state of the reverse display, since such a line is displayed first (even line), the sampling positions in FIGS. 5A to 5C do not correspond to the delta arrangement in FIG. 3. Therefore, in the vertical direction conversion unit 202, the positions of the pixels which are sampled are set to positions different from those in the normal display.

In FIG. 2A, the horizontal direction conversion unit 201 reads out the moving image signal from the memory 102, converts the number of pixels in the horizontal direction into 640 pixels, and stores the reduced moving image signal into the memory 102 as mentioned above. The vertical direction conversion unit 202 reads out the moving image signal from the memory 102 and converts the number of pixels in the horizontal direction into 320 pixels in accordance with the number of pixels of the display. At this time, the vertical direction conversion unit 202 samples the pixels at the positions different from those in the case of the normal display in response to a reverse display instruction from the control unit 106. The positions of the pixels which are sampled in the reverse display mode are illustrated in FIGS. 8A to 8C. FIGS. 8A to 8C illustrate the sampling positions of the luminance signal Y and the color difference signals Cr and Cb, respectively.

As illustrated in FIGS. 8A to 8C, in each line, the pixels at the positions different from the sampling positions in the case of the normal display illustrated in FIGS. 5A to 5C are sampled.

The vertical direction conversion unit 202 converts the number of pixels in the vertical direction of the moving image signal into 240 pixels in accordance with the number of pixels of the display and outputs the converted signal to the image quality adjustment unit 203. The image quality adjustment unit 203 processes the moving image signal and outputs the processed signal to the multiplexing unit 204 as mentioned above.

Also with respect to the OSD signal, the number of pixels in the horizontal direction is converted into 640 pixels by the horizontal direction conversion unit 207 in a manner similar to that in the case of the normal display. As illustrated in FIGS. 8A to 8C, by the vertical direction conversion unit 208, the pixels at the positions different from the those in the case of the normal display are sampled with respect to each line, the number of pixels in the horizontal direction is converted into 320 pixels, thereafter, the number of pixels in the vertical direction is converted into 240 pixels, and the converted signal is output to the multiplexing unit 204.

Figure 9A:
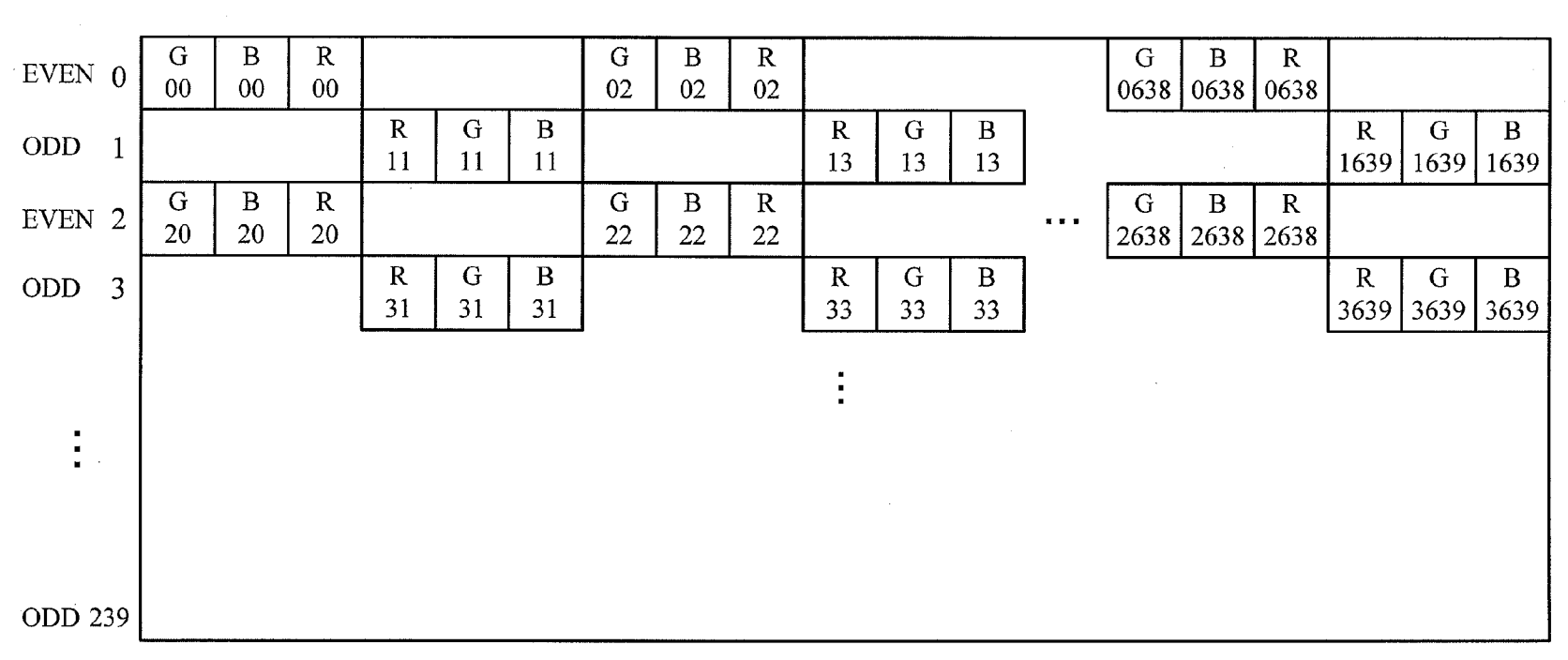

The multiplexing unit 204 multiplexes the moving image signal and the OSD signal and outputs the multiplexed signal to the RGB conversion unit 205. The RGB conversion unit 205 converts the luminance signal Y and the color difference signals Cr and Cb of the moving image signal output from the multiplexing unit 204 into the color component signals of RGB as mentioned above. The RGB signals which are output from the RGB conversion unit 205 are illustrated in FIG. 9A.

The moving image signal output from the RGB conversion unit 205 is sent to the gravity correction unit 206. The gravity center correction unit 206 corrects the center of gravity of each of the RGB pixels in the moving image signal output from the RGB conversion unit 205 so as to become the center of gravity corresponding to the pixel arrangement of the display in the display unit 104. When the reverse display instruction is issued from the control unit 106, the gravity center correction unit 206 properly corrects the center of gravity in accordance with the pixel arrangement in the state where the display unit 104 has been rotated.

Figure 9B:
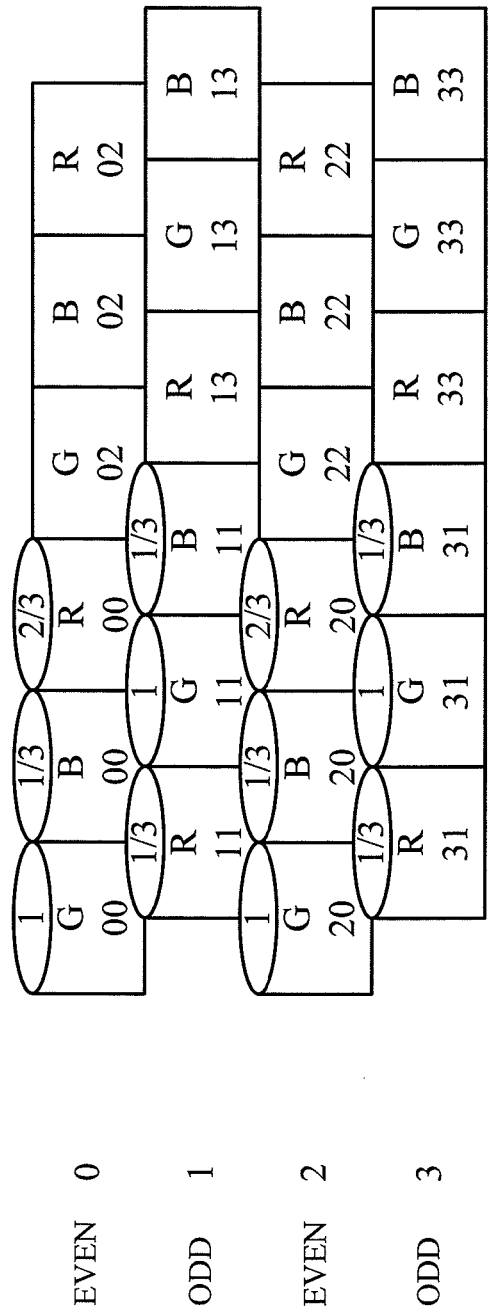

FIG. 9B illustrates a center of gravity of each pixel in the reverse display mode. The gravity center correction unit 206 sets the coefficients of the filter so that the center of gravity of each pixel becomes the center of gravity illustrated in FIG. 9B. The moving image signal constructed by the RGB signals in which the center of gravity of each pixel has been changed by the gravity center correction unit 206 in accordance with the reverse display is output to the display unit 104.

When the reverse display instruction is issued from the control unit 106, the display unit 104 sequentially displays the lines of the moving image signal output from the display control unit 103 from the bottom line of the image in order opposite to that in the case of the normal display.

As mentioned above, in the embodiment, such a construction that the moving image signal in which the number of pixels is larger is displayed on the display of the delta arrangement of n pixels in the horizontal direction×m pixels in the vertical direction (n and m are predetermined natural numbers, respectively) is disclosed. That is, the number of horizontal pixels of the moving image signal composed of the luminance signal and the color difference signals is temporarily converted into 2n pixels the number of which is twice as large as the number n of display pixels of the display. While the sampling positions are deviated between the lines, the number of pixels in the horizontal direction is converted into n pixels in accordance with the number of horizontal pixels of the display and the number of pixels in the vertical direction into is converted into m pixels. After that, the luminance signal and the color difference signals are converted into the color component signals of RGB and, further, the center of gravity of each pixel is corrected in accordance with the pixel arrangement of the display.

Also in the case of the reverse display, it is sufficient to properly set a construction of the sampling positions of the horizontal pixels in the vertical direction conversion unit and the correction of the center of gravity in correspondence to the type of pixel arrangement of the display unit 104.

As mentioned above, according to the present invention, the image signal processing apparatus which can output the high definition image corresponding to the pixel arrangement of the display without using a high precision interpolation filter or the like. Specifically speaking, in the case where the image in which the number of pixels is larger is displayed to the display apparatus in which the number of pixels is smaller, the high definition image can be displayed while suppressing an increase in circuit scale and costs and suppressing deterioration in image quality. Particularly, even in the display apparatus of the delta arrangement in which the pixel arrangement is deviated between the adjacent pixel lines in the horizontal direction, the high definition image can be displayed to the display apparatus of the smaller number of pixels while suppressing an increase in circuit scale and costs and suppressing deterioration in image quality.

Although the embodiment has been described with respect to the case where the moving image is displayed in the video camera for photographing the moving image, the invention can be also similarly applied to a case of displaying an image signal of a still image or the like. The invention can be also applied to a case where in an apparatus without an image pickup unit, a high definition image which is provided (obtained) through a recording medium, communication, or the like is displayed to a display unit of the small number of pixels. In this case, it is sufficient to store the provided high definition image (for example, moving image file) into the memory 102.

Naturally, the object of the invention is also accomplished by the following construction: that is, a construction in which a storage medium in which a program code of software for realizing the functions of the embodiments mentioned above has been recorded is supplied to a system or an apparatus. In this case, the invention is accomplished by a method whereby a computer (or a CPU or MPU) of the system or apparatus reads out and executes the program code stored in the storage medium.

In this case, the program code itself read out of the storage medium realizes the functions of the embodiments mentioned above. The program code itself and the storage medium in which the program code has been stored construct the invention.

As a storage medium for supplying the program code, for example, a flexible disk, a hard disk, an optical disk, a magnetooptic disk, a CD-ROM, a CD-R, a magnetic tape, a non-volatile memory card, a ROM, or the like can be used.

Naturally, the invention incorporates not only a case where the functions of the embodiments mentioned above are realized by a method whereby the computer executes the read-out program code but also the following case: that is, an OS (basic system or operating system) or the like which is operating on the computer executes a part or all of actual processings on the basis of instructions of the program code and the functions of the embodiments mentioned above are realized by those processings.

Further, the invention incorporates a case where the program code read out of the storage medium is written into a memory provided for a function expanding board inserted in the computer or a function expanding unit connected to the computer: that is, a case where a CPU or the like provided for the function expanding board or the function expanding unit executes a part or all of actual processings on the basis of instructions of the program code written in the memory and the functions of the embodiments mentioned above are realized by those processings.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-273567, filed on Dec. 8, 2010, which is hereby incorporated by reference herein in its entirety.

What is claimed is:

1. An image signal processing apparatus for outputting an image signal to a display apparatus having a predetermined pixel arrangement of n pixels in a horizontal direction and m pixels in a vertical direction (n and m are natural numbers, respectively), comprising:
   an input unit configured to input an image signal composed of a luminance signal and color difference signals;
   a memory;
   a first conversion unit configured to convert the number of pixels in the horizontal direction of the image signal input by the input unit into 2n pixels and store the image signal in which the number of pixels is converted into the memory;
   a second conversion unit configured to read out the image signal stored in the memory by the first conversion unit and sample the pixels of the read-out image signal in accordance with the predetermined pixel arrangement of the display apparatus, thereby converting the number of pixels in the horizontal direction of the read-out image signal into n pixels and converting the number of pixels in the vertical direction of the read-out image signal into m pixels;
   a color conversion unit configured to convert the image signal output from the second conversion unit into a plurality of color component signals corresponding to the pixels of the display apparatus; and
   a correction unit configured to correct a center of gravity of each of the plurality of color component signals output from the color conversion unit in accordance with the predetermined pixel arrangement of the display apparatus and output the color component signals in each of which the center of gravity is corrected, to the display apparatus,
   wherein the plurality of color component signals are signals of red, green and blue, and
   wherein the second conversion unit decides positions of the pixels which are to be sampled, such that the positions of the pixels of green in the color component signals output from the color conversion unit correspond to the positions of the pixels of green in the display apparatus.

2. An apparatus according to claim 1, wherein the predetermined pixel arrangement is one of a stripe arrangement and a delta arrangement.

3. An apparatus according to claim 1, wherein the second conversion unit samples the pixels of one line at every other pixel and changes positions of the pixels which are to be sampled between adjacent lines.

4. An apparatus according to claim 1, wherein the first conversion unit has a filter for limiting a frequency band in the horizontal direction of the image signal input by the input unit and samples the pixels of the image signal processed by the filter, and a limiting frequency band of the filter is a frequency higher than a frequency obtained by multiplying the frequency of the input image signal by a ratio between the number of pixels in the horizontal direction of the image signal input by the input unit and the number of pixels in the horizontal direction of the display apparatus.

5. An apparatus according to claim 1, further comprising:
an output unit configured to output an on-screen display signal which is to be multiplexed to the input image signal and displayed; and
a multiplexing unit configured to multiplex the on-screen display signal output from the output unit and the image signal output from the second conversion unit, and
wherein the on-screen display signal output from the output unit is composed of a luminance signal and color difference signals, and the number of pixels in each of the horizontal direction and the vertical direction and pixel positions of the on-screen display signal output from the output unit are the same as the number of pixels in each of the horizontal direction and the vertical direction and pixel positions of the image signal output from the second conversion unit, respectively.

6. An apparatus according to claim 5, wherein the output unit comprises:
a unit configured to input the on-screen display signal;
a third conversion unit configured to convert the number of pixels in the horizontal direction of the input on-screen display signal into 2n pixels and store the on-screen display signal in which the number of pixels is converted into the memory; and
a fourth conversion unit configured to read out the on-screen display signal stored in the memory by the third conversion unit and sample the pixels of the read-out on-screen display signal in accordance with the pixel arrangement of the display apparatus, thereby converting the number of pixels in the horizontal direction of the read-out on-screen display signal into n pixels and converting the number of pixels in the vertical direction of the read-out on-screen display signal into m pixels, and
wherein the fourth conversion unit outputs the on-screen display signal to the multiplexing unit.

7. An apparatus according to claim 1, wherein when the display apparatus is in a state of a reverse display, the second conversion unit samples the pixels of the image signal read out from the memory in such a manner that the pixels at positions different from positions of the pixels which are sampled in a state of a normal display are sampled.

8. An apparatus according to claim 1, further comprising:
an image pickup unit;
a recording and reproducing unit configured to record an image signal obtained by the image pickup unit on a recording medium and to reproduce an image signal from the recording medium,
wherein the input unit inputs one of the image signal obtained by the image pickup unit and the image signal reproduced by the recording and reproducing unit.

9. An apparatus according to claim 1, wherein the number of pixels in the horizontal direction of the display apparatus is 320, and the predetermined pixel arrangement of the display apparatus is a delta arrangement.

10. An image pickup apparatus comprising:
an image pickup unit configured to photograph an object and output an image signal composed of a luminance signal and color difference signals;
a recording reproducing unit configured to record the image signal output from the image pickup unit in a recording medium and reproduce the image signal from the recording medium;
a memory;
a display control unit configured to display an image on a display apparatus having a predetermined pixel arrangement of n pixels in a horizontal direction and m pixels in a vertical direction (n and m are natural numbers, respectively);
an input unit configured to input one of the image signal obtained from the image pickup unit and the image signal reproduced from the recording medium by the recording reproducing unit;
a first conversion unit configured to convert the number of pixels in the horizontal direction of the input image signal into 2n pixels and store the image signal in which the number of pixels is converted into the memory;
a second conversion unit configured to read out the image signal stored in the memory by the first conversion unit and sample the pixels of the read-out image signal in accordance with the predetermined pixel arrangement of the display apparatus, thereby converting the number of pixels in the horizontal direction of the read-out image signal into n pixels and converting the number of pixels in the vertical direction of the read-out image signal into m pixels,
wherein the second conversion unit samples the pixels of one line at every other pixel and changes positions of the pixels which are to be sampled between adjacent lines;
a color conversion unit configured to convert the image signal output from the second conversion unit into a plurality of color component signals corresponding to the pixels of the display apparatus; and
a correction unit configured to correct a center of gravity of each of the plurality of color component signals output from the color conversion unit in accordance with the predetermined pixel arrangement of the display apparatus and output the color component signals in each of which the center of gravity is corrected to the display apparatus.

11. An apparatus according to claim 10, wherein the predetermined pixel arrangement is one of a stripe arrangement and a delta arrangement.

12. An apparatus according to claim 10, wherein the plurality of color component signals are signals of red, green and blue and the second conversion unit decides positions of the pixels which are to be sampled, such that the positions of the pixels of green in the color component signals output from the color conversion unit correspond to the positions of the pixels of green in the display apparatus.

13. An apparatus according to claim 10, wherein the first conversion unit has a filter for limiting a frequency band in the horizontal direction of the image signal input by the input unit and sampling the pixels of the image signal processed by the filter, and a limiting frequency band of the filter is a frequency higher than a frequency obtained by multiplying the frequency of the input image signal by a ratio between the number of pixels in the horizontal direction of the image signal input by the input unit and the number of pixels in the horizontal direction of the display apparatus.

14. An apparatus according to claim 10, further comprising:
- an output unit configured to output an on-screen display signal which is to be multiplexed to the input image signal and displayed; and
- a multiplexing unit configured to multiplex the on-screen display signal output from the output unit and the image signal output from the second conversion unit, and
- wherein the on-screen display signal output from the output unit is composed of a luminance signal and color difference signals, and the number of pixels in each of the horizontal direction and the vertical direction and pixel positions of the on-screen display signal output from the output unit are the same as the number of pixels in each of the horizontal direction and the vertical direction and pixel positions of the image signal output from the second conversion unit, respectively.

15. An apparatus according to claim 14, wherein the output unit comprises:
- a unit configured to input the on-screen display signal;
- a third conversion unit configured to convert the number of pixels in the horizontal direction of the input on-screen display signal into 2n pixels and store the on-screen display signal in which the number of pixels is converted into the memory; and
- a fourth conversion unit configured to read out the on-screen display signal stored in the memory by the third conversion unit and sample the pixels of the read-out on-screen display signal in accordance with the pixel arrangement of the display apparatus, thereby converting the number of pixels in the horizontal direction of the read-out on-screen display signal into n pixels and converting the number of pixels in the vertical direction of the read-out on-screen display signal into m pixels, and
- wherein the fourth conversion unit outputs the on-screen display signal to the multiplexing unit.

16. An apparatus according to claim 10, wherein when the display apparatus is in a state of a reverse display, the second conversion unit samples the pixels of the image signal read out from the memory in such a manner that the pixels at positions different from positions of the pixels which are sampled in a state of a normal display are sampled.

17. An image signal processing method of outputting an image signal to a display apparatus having a predetermined pixel arrangement of n pixels in a horizontal direction and m pixels in a vertical direction (n and m are natural numbers, respectively), comprising:
- an input step of inputting an image signal composed of a luminance signal and color difference signals;
- a first converting step of converting the number of pixels in the horizontal direction of the image signal input in the input step into 2n pixels and storing the image signal in which the number of pixels has been converted into a memory;
- a second converting step of reading out the image signal stored in the memory in the first converting step and sampling the pixels of the read-out image signal in accordance with the predetermined pixel arrangement of the display apparatus, thereby converting the number of pixels in the horizontal direction of the read-out image signal into n pixels and converting the number of pixels in the vertical direction of the read-out image signal into m pixels;
- a color converting step of converting the image signal obtained in the second converting step into a plurality of color component signals corresponding to the pixels of the display apparatus; and
- a correcting step of correcting a center of gravity of each of the plurality of color component signals obtained in the color converting step in accordance with the predetermined pixel arrangement of the display apparatus and outputting the color component signals in each of which the center of gravity is corrected, to the display apparatus,
- wherein the plurality of color component signals are signals of red, green and blue, and
- wherein the second converting step includes deciding positions of the pixels which are to be sampled, such that the positions of the pixels of green in the color component signals output in the color conversion step correspond to the positions of the pixels of green in the display apparatus.

18. A control method of an image pickup apparatus having a display apparatus having a predetermined pixel arrangement of n pixels in a horizontal direction and m pixels in a vertical direction (n and m are natural numbers, respectively), an image pickup unit configured to photograph an object and output an image signal composed of a luminance signal and color difference signals, a recording reproducing unit configured to record the image signal output from the image pickup unit in a recording medium and reproduce the image signal from the recording medium, and a memory, comprising:
- an input step of inputting one of the image signal obtained from the image pickup unit and the image signal reproduced from the recording medium by the recording reproducing unit;
- a first converting step of converting the number of pixels in the horizontal direction of the input image signal into 2n pixels and storing the image signal in which the number of pixels is converted into the memory;
- a second converting step of reading out the image signal stored in the memory in the first converting step and sampling the pixels of the read-out image signal in accordance with the predetermined pixel arrangement of the display apparatus, thereby converting the number of pixels in the horizontal direction of the read-out image signal into n pixels and converting the number of pixels in the vertical direction of the read-out image signal into m pixels, wherein the second converting step samples the pixels of one line at every other pixel and changes positions of the pixels which are to be sampled between adjacent lines;
- a color converting step of converting the image signal output from the second converting step into a plurality of color component signals corresponding to the pixels of the display apparatus; and
- a correcting step of correcting a center of gravity of each of the plurality of color component signals output in the color converting step in accordance with the predetermined pixel arrangement of the display apparatus and outputting the color component signals in each of which the center of gravity is corrected to the display apparatus.

* * * * *